United States Patent [19]
Chia et al.

[11] Patent Number: 5,298,470
[45] Date of Patent: Mar. 29, 1994

[54] SILICON CARBIDE BODIES HAVING HIGH TOUGHNESS AND FRACTURE RESISTANCE AND METHOD OF MAKING SAME

[75] Inventors: Kai Y. Chia, Lewiston, N.Y.; Wolfgang D. G. Boecker, Frankfurt am Main, Fed. Rep. of Germany; Roger S. Storm, Clarence, N.Y.

[73] Assignee: The Carborundum Company, Niagara Falls, N.Y.

[21] Appl. No.: 960,178

[22] Filed: Oct. 9, 1992

Related U.S. Application Data

[63] Continuation of Ser. No. 640,675, Jan. 14, 1991, abandoned, which is a continuation-in-part of Ser. No. 411,070, Sep. 22, 1989, abandoned.

[51] Int. Cl.$^5$ .............................................. C04B 35/56
[52] U.S. Cl. ........................................ 501/89; 501/92
[58] Field of Search ............................... 501/88, 89, 92

[56] References Cited

U.S. PATENT DOCUMENTS

| | | | |
|---|---|---|---|
| 3,259,509 | 7/1966 | Matkovich | 106/65 |
| 3,287,478 | 11/1966 | Pallen | 264/63 |
| 3,649,310 | 3/1972 | Yates | 106/44 |
| 3,649,342 | 3/1972 | Bartlett | 117/123 |
| 3,759,725 | 12/1973 | Steen | 106/44 |
| 3,968,057 | 7/1976 | Dulin | 252/516 |
| 3,998,646 | 12/1976 | Weaver | 106/44 |
| 4,004,934 | 1/1977 | Prochazka | 106/44 |
| 4,097,293 | 6/1978 | Komeya | 106/43 |
| 4,124,667 | 11/1978 | Coppola | 264/29.5 |
| 4,141,740 | 2/1979 | Cutler | 106/44 |
| 4,179,299 | 12/1979 | Coppola | 106/44 |
| 4,230,497 | 10/1980 | Schweta | 106/44 |
| 4,312,954 | 1/1982 | Cappola | 501/90 |
| 4,332,755 | 6/1982 | Murata | 264/65 |
| 4,354,991 | 10/1982 | Suzuki | 264/65 |
| 4,502,983 | 3/1985 | Omori | 252/516 |
| 4,526,734 | 7/1985 | Enomoto | 264/13 |
| 4,564,490 | 1/1986 | Omori | 264/65 |
| 4,569,921 | 2/1986 | Omori | 501/88 |
| 4,569,922 | 2/1986 | Suzuki | 501/89 |
| 4,578,363 | 3/1986 | Campos-Loriz | 501/89 |
| 4,681,861 | 7/1987 | Saito | 501/89 |
| 4,687,657 | 8/1987 | Clark | 423/412 |
| 4,692,418 | 9/1987 | Boecker | 501/90 |
| 4,695,294 | 9/1987 | Korzekwa | 51/307 |
| 4,729,972 | 3/1988 | Kodama | 501/91 |
| 4,743,571 | 5/1988 | Steinmann | 501/97 |
| 4,753,903 | 6/1988 | Saito | 501/88 |
| 4,775,393 | 10/1988 | Boecker | 51/293 |
| 4,826,791 | 5/1989 | Mehrotra | 501/89 |
| 4,829,027 | 5/1989 | Cutler | 501/89 |

FOREIGN PATENT DOCUMENTS

| | | |
|---|---|---|
| 8451384 | 10/1985 | Japan . |
| 63-21251 | 1/1988 | Japan . |
| 2082165 | 3/1982 | United Kingdom . |
| 2170511 | 8/1985 | United Kingdom . |
| 2170516 | 8/1986 | United Kingdom . |
| 2177116 | 1/1987 | United Kingdom . |

OTHER PUBLICATIONS

Boecker et al., "The Influence of Powder Characteristics on the Sinteries of LSiC." Powder Metallurgy International, vol. 13, Nov. 1, 1981.

Jang et al., "Densification of Alumnina-Silicon Carbide Powder Composites: I, Effects of a Polymer Coating on Silicon Carbide Particles" Journal American Ceramic Society vol. 72, pp. 948-953 (1989).

(List continued on next page.)

Primary Examiner—Mark L. Bell
Assistant Examiner—Deborah Jones
Attorney, Agent, or Firm—Scott A. McCollister; George W. Moxon, II

[57] ABSTRACT

A sintered silicon carbide ceramic body preferably produced from a uniform mixture comprising from about 82 percent to about 99.4 percent by weight silicon carbide, from about 0.5 percent to about 10 percent by weight of a nitrogen containing aluminum compound and from about 0.1 to about 8 percent of a rare earth oxide, both reacted with oxygen, wherein said sintered ceramic body has a density greater than 90% percent of theoretical and a fracture toughness, as measured by a single edge notched beam test, of more than 7 MPam$^{\frac{1}{2}}$ and method of making the same.

49 Claims, 1 Drawing Sheet

OTHER PUBLICATIONS

Johnson et al., "Microstructures of Sintered SiC". Published prior to 1989.

Laffon et al., "Study of Nicalon-based ceramic fibres and powders by EXAFS spectrometry..." Journal of Material Science 24 (1989) 1503–1512.

Li et al., "Indentation Fracture Toughness of Sintered Silicon Carbide in the Palmquist Crack Regime" J. Am. Ceram. Soc. vol. 72 [6] pp. 904–911 (1989).

Omori et al., "Pressureless Sintering of SiC" Communications of the American Ceramic Society, C-92; Jun. 1982.

Oscrof et al., "High Temperature Silicon Aluminum Carbonitrides", The American Ceramic Soc., 1989.

Patience et al., "Ceramic Alloys of Silicon Carbide with Aluminum Nitride and Nitrogen", Proc. of International Symposium on Ceramic Components for Engine, (1983).

Reed et al., "the unit cell and spare group of $2Y_2O_3$–$Al_2O_3$", Acta Cryst. vol. 15, 812 (1962).

Takeda et al., "Effects of Additives on Microstructure and Strength of Dense Silicon Carbide", 23rd. Japan Congress, 1980.

Thummler et al., "Results of Microanalytical Investigations of SiC-Ceramics and their Impact on Materials", 1986 John Wiley & Sons pp. 453–461.

Zangvil et al., "Phase Relationships in the Silicon Carbide–Aluminum Nitride System", J. Am. Ceramic Soc. 71[10] 884–90 (1988).

Takeda et al., "Effects of Elemental Additives on Densification, Microstructure, Strength, and Thermal Conductivity of Silicon Carbide Ceramics", Advanced Ceramic Materials, 1[2] 162–65 (1986).

SILICON CARBIDE BODIES HAVING HIGH TOUGHNESS AND FRACTURE RESISTANCE AND METHOD OF MAKING SAME

This is a continuation of co-pending application Ser. No. 07/640,675 filed Jan. 14, 1991, now abandoned, which is a continuation in part application of Ser. No. 07/411,070 filed Sep. 22, 1989, now abandoned.

BACKGROUND OF THE INVENTION

This invention relates in general to sintered ceramic bodies. In one respect, this invention is directed to polycrystalline sintered bodies based on silicon carbide which exhibit high fracture toughness and relatively lower brittleness and good chipping resistance. In a further aspect, the invention is directed to a process for the preparation of sintered bodies and the use of sintering additives to promote the formation of a transient liquid phase during the densification of silicon carbide.

Structural ceramic materials which retain their strengths to temperatures on the order of 1400° C. to 1500° C. are desirable for their application in high temperature environments including, for example, those encountered in automotive applications such as gas turbines, diesel superchargers, stirling engines and the like. Currently silicon carbide and silicon nitride are the leading contending materials for use in gas turbine engines. "SiAlON", an acronym derived from the chemical symbols of the constituents silicon, aluminum, oxygen and nitrogen, is a group of materials which are somewhat related to silicon nitride and which generally exhibit higher toughness, but lower strengths than silicon nitride, and higher strengths, but lower oxidation and creep resistance than silicon carbide.

Silicon nitride ($Si_3N_4$) is typically densified, aided by a liquid glassy phase, at temperatures ranging from 1500° C. to 1850° C. for times which can be as short as 30 minutes. The presence of a liquid phase is critical to the process since it allows alpha phase silicon nitride to be converted into beta phase silicon nitride. The initially present alpha phase silicon nitride transforms into beta phase silicon nitride. This process produces an acicular microstructure (as distinguished from an equiaxed microstructure) which can provide good fracture toughness. Typical sintering aids used to densify $Si_3N_4$ include MgO, $Y_2O_3$, $Al_2O_3$, $ZrO_2$, $CeO_2$, and CaO. These oxides and others react with silica present on the surface of the silicon nitride to form a glassy amorphous (noncrystalline) phase at temperatures below 1850° C. This glassy phase tends to inhibit creep resistance at elevated temperatures of 800° C. and above. Decomposition of $Si_3N_4$ begins as low as 1000° C. and becomes progressively greater as temperature is increased, becoming quite excessive at temperatures greater than 1700° C. Although $Si_3N_4$ materials can have a greater strength and toughness than conventional SiC and therefore can be more resistant to catastrophic failure, SiC has higher hardness and is therefore preferred in wear applications. Also, SiC has a higher resistance to creep which is beneficial in heat engine applications. Creep is that property of any material wherein deformation occurs at elevated temperatures either with an applied load or otherwise.

The chemical and physical properties of silicon carbide make it an excellent material for high temperature structural applications, such as gas turbine engine components. These desirable properties include excellent oxidation resistance and corrosion resistance, relatively high thermal conductivity compared to other ceramics, relatively low thermal expansion coefficient compared to metals, relatively high resistance to thermal shock and relatively high strength at elevated temperatures. For example, SiC is stronger than the nickel superalloys at temperatures above 1000° C. and has better creep and oxidation resistance, as well as being potentially less expensive. Another advantage is that the theoretical density of silicon carbide, being 3.21 g/cm³, is less than half that of the superalloys. On the other hand, other characteristics of known bodies of essentially pure sintered silicon carbide, particularly those produced by known pressureless sintering processes, are considered undesirable, including inability to be electrical discharge machined (EDM) at an acceptable rate due to generally poor electrical conductivity (high electrical resistivity), high sensitivity of the microstructure to variations in sintering conditions, grain growth upon extended or repeated exposure to relatively high temperatures above about 1900° C., and low (relative to SiAlON or silicon nitride) fracture toughness.

The sintering of silicon carbide, in the absence of applied mechanical pressure ("pressureless sintering"), has been accomplished using various sintering aids. Those sintering aids include carbon (C), boron (B) and compounds thereof, e.g., boron carbide ($B_4C$), and aluminum (Al), and compounds thereof, e.g., alumina ($Al_2O_3$), individually and/or in combination. Such sintering aids have been used to obtain essentially nearly single crystalline phase silicon carbide with relatively high densities, for example, 97% of theoretical density or greater. "Sinter-active SiC powders", those having high specific surface areas of about 1 $M^2/g$ to 100 $m^2/g$, and an average nominal diameter of about one micron or less, with some powders being less than 0.5 microns in average nominal diameter, are considered necessary to achieve relatively high densities, for example, as is described in U.S. Pat. No. 4,312,954.

The sintering of conventional silicon carbide (using boron and carbon as sintering additives) typically takes place at temperatures of at least 1900° C. but below 2500° C., and typically in a range of about 2100° C. to 2250° C., and is accomplished principally by solid state diffusion without the occurrence of a liquid phase; this is known as solid state sintering. Pressureless sintering allows for the economically viable commercial fabrication of complex shapes, and so it is desirable for silicon carbide particles to be densified without applied mechanical pressure, as well as at reduced temperatures, due to the fact that high temperatures are known to promote grain growth and a consequent deterioration in physical properties.

A drawback of conventional silicon carbide ceramic material is its brittleness, which, for example, causes the edges of a sintered body to be easily chipped in handling, resulting in poor production yields. Another drawback is sensitivity to the introduction of internal flaws during the production process, causing low strength values, rendering the resultant material undependable in respect to the application of localized high stresses during use. The known sintered silicon carbides, including the conventional materials, do not exhibit high enough toughness to overcome the loss of strength occasioned by such flaws, even when such flaws are relatively minor.

Silicon carbide densification by the pressureless sintering method, with sintering additives, has been the subject of various patents including the SiC—B—C system (U.S. Pat. Nos. 4,179,299; 4,004,934; 4,526,734; 4,692,418; 4,124,667; and 3,649,342) and the SiC—Al—C system, (U.S. Pat. No. 4,692,418 to Boecker, et al, 1979 and U.S. Pat. No. 4,230,497 to Schwetz, et al).

The SiC—B—C system provides different properties depending upon the amount of sintering additives and the particular production process used. These properties allow various applications of silicon carbide from armor tiles to electrical heating elements. However, the extremely high hardness and the transgranular fracture mode, inherent in such conventional silicon carbide, produce relatively low fracture toughness. The typical fracture toughness data for SiC—B—C system is between 4 and 5 MPam$^{\frac{1}{2}}$ measured by the single edge notched beam (SENB) test method as is well known to those with skill in the art.

The SiC—Al—C combination is another well-studied system which also offers high density, good high temperature strengths and thermal stability. This material also exhibits a transgranular fracture mode at room temperature and intergranular fracture mode at elevated temperature. Oxidation resistance is reported to be better than that of the SiC—B—C system. Fracture toughness for this system is typically within the range of about 4 and 6 MPam$^{\frac{1}{2}}$.

Silicon carbide has been sintered to high density, using rare earth oxides as additives, usually resulting in high strength. Omori, et al. U.S. Pat. Nos. 4,502,983, 4,564,490, and 4,569,921 disclose the use of rare earth oxides to promote solid state diffusion sintering. These inventions require the use of SiC of submicron size and typically result in surfaces having higher concentrations of rare earth oxides. High bend strength, between 59.6 ksi and 127.7 ksi are reported, however, it is not known whether or not these strengths are based on a three-point test method (which has been generally used in Japan and which generally gives values which are 30% to 50% higher than a four-point test) or based on the four-point bend test method which is more universally accepted and considered more representative and more reflective of accurate true bend strength. The Saito U.S. Pat. No. 4,681,861 teaches the use of Y$_2$O$_3$—Al$_2$O$_3$—Cr$_2$O$_3$ as sintering additives and reports very dense silicon carbide bodies. A bend strength of 42.6–66.7 ksi (by the four-point bend test method, but using 4 mm × 3 mm × 35 mm test pieces in accord with Japanese standard JIS R-1601) and indentation fracture toughnesses of 5–6 MPam$^{\frac{1}{2}}$ were also reported, and the product had good corrosion resistance at high temperatures in contact with molten steel. Virkar, et al. U.S. patent application Ser. No. 778,251, which is disclosed in U.S. Pat. No. 4,829,027 to Cutler et al., discloses a method for densifying mixtures containing Si—C—Al—O—N into a solid state diffusion sintered body, as taught by U.S. Pat. No. 4,141,740, using a liquid phase provided by the carbothermal reduction of alumina (Al$_2$O$_3$) to produce "SiCAlON". Such a technique is not believed to result in ceramic material exhibiting high fracture toughness.

Japanese published patent application ("Kokai") to Nagano, Application No. 51384/59 filed Mar. 16, 1984 and Publication No. 195057/60 published Oct. 3, 1985 discloses a system wherein Al$_2$O$_3$, CeO$_2$ and SiO$_2$, in separate and distinct powder forms are mixed with SiC powder, formed with a temporary binder and sintered within a temperature range of 1800° C. to 1950° C. This prior art application teaches firstly that it is absolutely necessary to add SiO$_2$ as a separate and distinct powder, secondly, that the sintered body will decompose at sintering temperatures above 1950° C. causing the loss of shape of that body and a substantial reduction in bend strength and, thirdly, that the mechanism is entirely liquid phase. This prior art application, insofar as the sintering additives are concerned, also teaches that AlN can be substituted for Al$_2$O$_3$ and that Y$_2$O$_3$ can be substituted for CeO$_2$.

SUMMARY OF THE INVENTION

A pressureless sintered silicon carbide ceramic body having a density of about 90% of theoretical density or greater, having relatively high fracture toughness, relatively high bend strength and relatively low brittleness is disclosed. The silicon carbide ceramic body is initially densified through the early formation of a transient liquid phase formed at the low end of the sintering temperature range of the present invention by the interaction of sintering additives, namely about 0.1% by weight to about 8% by weight of rare earth oxides, or mixtures of different rare earth oxides, with about 0.5% by weight to about 10% by weight of nitrogen containing aluminum compounds, such as, for example, aluminum nitride, and with reactive surface or other oxygen preferably in the range of about 0.3% by weight to about 4% by weight, the elements of such sintering additives which are finally included in the ceramic body as a distinct, discontinuous crystalline second phase, with portions of both the aluminum and nitrogen being diffused internally in the individual crystals of the silicon carbide, doping those crystals to result in the formation of carrier concentrations without the formation of solid solutions such as SiC—AlN therein. The resulting ceramic body can be characterized as having an equiaxed grain structure, and exhibits a fracture toughness of greater than 7 MPam$^{\frac{1}{2}}$, and frequently greater than 9 MPam$^{\frac{1}{2}}$, in combination with a four-point bend strength, typically, of greater than about 60 ksi, along with decreased brittleness and excellent corrosion, erosion and oxidation resistance.

The preferred method for producing such a sintered silicon carbide ceramic body comprises: (I) forming a homogeneous mixture comprising; (a) one or more nitrogen containing aluminum compounds in a combined amount of from about 0.5% weight or less to about 10% by weight based on the weight of the mixture; (b) one or more rare earth oxides in a combined amount of from about 0.1% by weight to about 8% by weight based on the weight of the mixture; and (c) silicon carbide powder having a specific surface area preferably of from about 1 m$^2$/g to about 100 m$^2$/g and having a reactive surface oxygen content of preferably from about 0.3% by weight to about 4% by weight or higher, in an amount of from about 82% by weight to about 99.4% by weight based on the weight of the mixture; and (d) combining that with a temporary binder; (II) shaping the mixture in such a way as to produce a shaped object having a density of at least about 40% of theoretical density, more preferably at least about 55% of the theoretical density, of the mixture; and (III) firing the shaped mixture under such conditions of time and temperature, in an atmosphere inert to silicon carbide or in a vacuum, until a sintered body having a density of at least 2.9 g/cm$^3$, a predominantly homogeneous, predominantly equiaxed and predominantly fine-grain microstructure of aluminum and nitrogen doped silicon carbide grains and a discontinuous crystalline second phase, is formed, such microstructure resulting, in part, from the formation of a transient liquid phase of sintering additives, at a sintering temperature of between about 1775° C., or lower, and 2200° C., the sintering temperature range being held for up to about 5 hours, the final sintering mechanism for the silicon carbide being solid state diffusion.

For the purposes of this application, a predominantly equiaxed microstructure is one where more than 50% of the grains of SiC in the final sintered product have an aspect ratio, i.e., the ratio of the grain length to width, of less than or equal to about 3:1. Also, for purposes of this application, a predominantly homogeneous equiaxed microstructure means that more than 50% of the silicon carbide grains which are not equiaxed, i.e., which have an aspect ratio of less than or equal to 3:1, are uniformly dispersed throughout the sintered body. Also, for purposes of this application a predominantly fine-grain microstructure is a microstructure in which more than 50% of the grains are 5 microns or less in nominal diameter. Also, as used herein, nominal diameter means the smallest diameter of a sphere within which a grain of the material would fit. Also, as used herein, predominant and predominantly mean more than 50%.

DETAILED DESCRIPTION OF THE INVENTION

Figure 1:
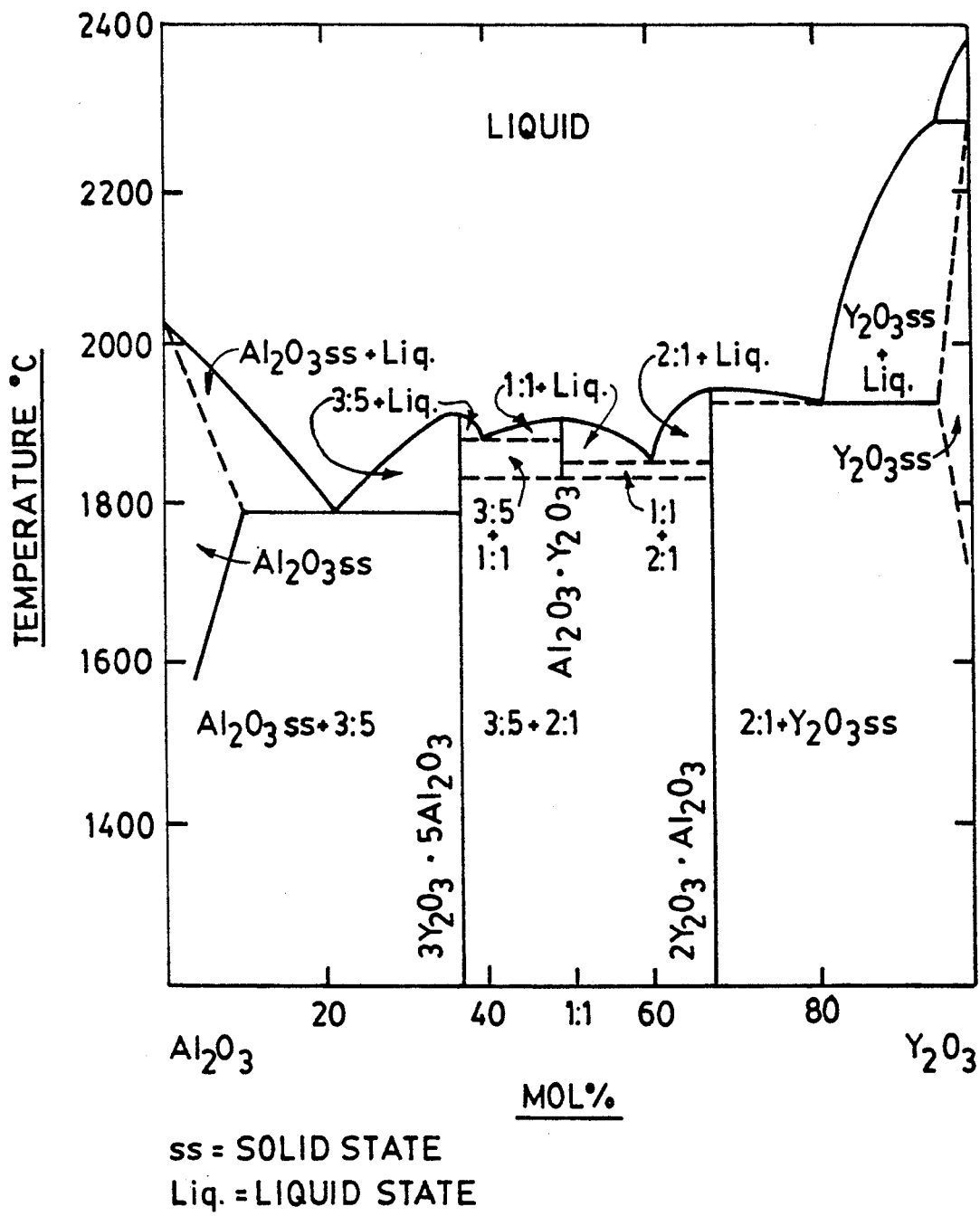
FIG. 1 is a phase diagram depicting the state of $Al_2O_3$ and $Y_2O_3$ at various temperatures and molecular percentages.

During sintering, it can be desirable to have a liquid phase which wets the matrix and allows particle rearrangement to occur in the presence of the liquid phase. Densification can occur rapidly within a narrow temperature range, or it can be relatively slow over a broader temperature range, or it can occur anywhere in between, depending on the extent of the liquid phase of the sintering additives which are present and the particular species and mixtures of those sintering additives, and the temperature at which sintering is done. Grain growth can be limited and controlled by the presence of such a liquid phase and the relative quantity thereof. Densification slows as the liquid phase dissipates or migrates. By controlling temperature and time at temperature, two important variables in the sintering process, one can readily obtain predominantly fine-grain microstructures, and one can control the degree of fine-grain microstructure formed. In the present invention, it was unexpectedly discovered that the combination of rare earth oxides, such as, for example, yttria ($Y_2O_3$), and nitrogen containing aluminum compounds, such as, for example, aluminum nitride (AlN), permit the formation of a liquid phase by high temperature chemical reactions, at sintering temperatures, of the rare earth oxide, e.g., $Y_2O_3$, with the nitrogen containing compound, e.g., AlN, and with either reactive, noncrystalline surface oxygen from the silicon carbide powders, in either an elemental or combined form, or reactive surface or other oxygen in any form from the nitrogen containing aluminum compounds (and possibly the aluminum and oxygen containing compounds produced by the high temperature chemical reaction(s)), or oxygen from both sources. Hydrated AlN and its derivatives, for examples AlOOH and/or $Al(OH)_3$, formed on the surface of the AlN, can be a source of oxygen in the system. The result is a substantial enhancement of the densification of SiC at temperatures and times which are low compared to those presently practiced in the art. Nevertheless, although not all of the details of the exact densification mechanism have yet been fully verified, the sintering most likely can be characterized as initial transient liquid phase sintering and subsequent solid state diffusion sintering. Hereinafter, the process steps discussed above in this paragraph are sometimes referred to as "mixed mode sintering".

It has been noted that in the final sintered body, the majority of triple points, where more than two SiC grains intersect, exhibit concentrations of derivatives of the initial sintering additives and the reactive surface oxygen, always including the rare earth element(s) from the rare earth oxides which have been used initially, as well as aluminum and oxygen and, in some cases, nitrogen and carbon. For example, concentrations of YAM ($Al_2Y_4O_9$), YAG ($Al_5Y_3O_{12}$) and/or YAP ($AlYO_3$) as well as, in some cases, evidence of $Y_2Si_3O_3N_4$, $Y_{10}(SiO_4)_6N_2$ and/or $Y_3Si_3O_6N_3$, substantially in crystalline form, are found in the triple points in those cases where AlN and $Y_2O_3$ are used as initial sintering additives. The grain boundaries between the adjacent SiC grains are relatively quite clean, exhibiting some evidence of minute discontinuous traces of residual sintering additive elements in a non-crystalline form. In addition, the SiC grains are doped with aluminum and nitrogen internally within the crystalline structure of those grains. The aluminum and nitrogen existing in carrier concentrations, as is evidenced by the low electrical resistivity levels that can be obtained, and not as solid solutions such as SiC—AlN, which would be indicated by the formation of 2H polytype structures, which were not detected in any of the samples which were examined. Resultant silicon carbide bodies have greater fracture toughness than heretofore reported. Also, the resultant silicon carbide product has a predominantly homogeneous, predominantly fine-grain and predominantly equiaxed microstructure with the average nominal grain size being less than 5 microns and a density of at least 2.9 g/cm$_3$, a fracture toughness of at least about 7 MPam$^{\frac{1}{2}}$, and a bend strength in excess of 55 ksi. Further, the resultant silicon carbide product exhibits electrical resistivity in the range of about 0.02 to 10,000 Ohm cm at room temperature. Such a sintered body is sometimes referred to hereinafter as "mixed mode sintered silicon carbide".

Rare earth oxides, which are sometimes referred to herein as REO, are defined for the purpose of this invention as oxides of the following elements: Yttrium (Y), Scandium (SC), Actinium (AC) and oxides of the lanthanides including Lanthanum (La), Cerium (Ce), Praseodymium (Pr), Neodymium (Nd), Promethium (Pm), Samarium (Sm), Europium (Eu), Gadolinium (Gd), Terbium (Tb), Dysprosium (Dy), Holmium (Ho), Erbium (Er), Thulium (Tm), Ytterbium (Yb) and Lutetium (Lu). The foregoing elements, for purposes of this invention, are referred to herein as rare earth (RE) elements. At subliquidus temperatures, under equilibrium conditions, it is possible to react compounds of nitrogen containing aluminum compounds, rare earth oxides and reactive surface oxygen to form different compounds which include oxides of aluminum, e.g., aluminum oxide and/or its derivatives e.g., $Al(OH)_3$, AlOOH, etc., with molar ratios of, for example, yttrium to aluminum (included in an oxygen compound) of either 1:1, 1:2 or 3:5. These compounds are quite stable at room temperature. FIG. 1 shows a phase diagram indicating the application of this concept to Y—Al—O systems, including YAG, YAM and YAP as well as other compounds within the sintering temperature range of the present invention.

The amount and choice of sintering additives is determined to some extent by desired properties in the final sintered body. For example, if high temperature properties are desired for components, the amount of sintering additives should be relatively low and the combination of oxide phase(s) selected should have a melting point as high as possible. For another example, if low temperature applications are desired, then greater amounts of sintering additives can be utilized to promote the sintering of larger silicon carbide particles with higher amounts of impurities present, and compositions can be adjusted to allow liquids to form at lower temperatures and/or within shorter periods of time. For yet another example, to adjust electrical conductivity, the amounts of aluminum and nitrogen, in the system of the present invention can be varied.

To be reactive in the system of the present invention, the oxygen (characterized as "reactive oxygen") must exist as oxygen bound into non-crystalline oxygen containing compounds, which exist on and are chemically bound to the surface of the beginning SiC powder, and/or reactive oxygen in any form which exists in association with, and is chemically bound to or with those nitrogen containing aluminum compounds which are the beginning or initial compounds used in the process. The addition of separate oxygen containing compounds, such as crystalline $SiO_2$, do not add oxygen which is sufficiently reactive within the system and, in fact, do not produce the physical properties of the final sintered body of the system of the present invention unless a two-step sintering procedure utilized, with the second step including sintering at above 1950° C., preferably at 2050° C. or above, for a period of at least about 30 minutes. Compare, in Table III, the physical properties of Example Nos. 33 and 34 with those of Example Nos. 33A and 34A.

Various eutectic, peritectic, and congruent melting liquids can be formed using constituents of RE, Al, O and N with the lowest melting liquid occurring at about 1650° C. and the highest melting liquid occurring at about 2410° C. The melting point of any particular such composition depends upon the ratio of rare earth oxide(s) to nitrogen containing aluminum compound(s) and the species of rare earth oxide(s) and nitrogen containing aluminum compound(s) selected, taking into account the amount of reactive oxygen present in the system (not all oxygen contained in the initial mixture of components will react to a degree which is significant). Thus, for example, the melting point of the transient liquid phase can be altered by varying the ratio of yttria to aluminum nitride and consequently the ratio of yttria to alumina (the alumina being formed by reaction with, for example, surface oxygen from the SiC as indicated above), to form, for example, YAM, YAG and/or YAP.

The preferred choice of beginning components as sintering additives are $Y_2O_3$ and AlN. The amounts to be utilized are determined by the desired ease of processing and the various properties (e.g., oxidation resistance, thermal conductivity, electrical resistivity, thermal expansion behavior, etc.) desired in the densified sintered ceramic body but only by also taking into account the amount of reactive surface oxygen present in the system. Preferably, the transient liquid phase should fully wet the SiC and allow densification to occur at temperatures low enough to permit the formation of a high degree of fine grain microstructure as early in the densification process, and at the lowest temperature, as possible. The combination of high density achieved through mixed mode sintering, and fine grain microstructure formation achieved by densification at relatively low temperatures for short times, achieves the desired bend strength, fracture toughness, brittleness, hardness and wear resistance of the final sintered SiC.

Any one or more of the rare earth oxides (REO) in combination with one or more nitrogen containing aluminum compounds, can be used in the present invention. Also, different mixtures and combinations of REOs are readily substitutable for the individual REOs.

The amount of REO(s) in combination with the nitrogen containing aluminum compound(s), used in the initial mixture, is indicated both by the reactive surface oxygen present in the system and by the particular circumstances and conditions which may be applicable to the system and the manufacturing process. For example, an amount of 0.25 wt. % of $Y_2O_3$ and 2.5 wt. % of AlN, added to 97.25 wt. % of SiC will require a relatively higher sintering temperature in comparison to an amount of 8.0 wt. % of $Y_2O_3$, 10.0 wt. % of AlN and 82.0 wt. % of SiC being used to form a sintered body, given equivalent amounts of reactive oxygen in the system. On the other hand, by the addition of relatively higher amounts of sintering additives to the system, for example, the addition of 8.0 wt. % $Y_2O_3$ and 10.0 wt. % of AlN to 82.0 wt. % of SiC, the use of larger particle sizes of SiC starting powders, with greater amounts of impurities present therein, is enabled. In addition, the amount of the transient liquid phase is increased which enhances the early formation of a fine grain microstructure and early densification, and necessary sintering temperature can be decreased.

Although aluminum nitride (AlN) is preferred as the nitrogen containing aluminum compound, other polytypes thereof may be used. For example, aluminum nitride polytype 21R (6 AlN $SiO_2$) has been used and other aluminum nitride polytypes, 27R (8AlN $SiO_2$) 15R (4 AlN $SiO_2$), 8H (3 AlN $SiO_2$) and 12H (5 AlN $SiO_2$), are contemplated. Examples of aluminum oxynitride polytypes which are contemplated include 12H ($Al_6O_3N_4$), 16H ($Al_8O_3N_6$), 20H ($Al_{10}O_3N_8$), 21R ($Al_7O_3N_5$), and 27R ($Al_9O_3N_7$). Other nitrogen containing aluminum compounds contemplated are aluminum oxynitride (AlON), aluminum carboxynitride ($Al_3CON$) and aluminum oxynitride spinel (5 AlN 9 $Al_2O_3$), but this listing is not exhaustive.

The ratio of aluminum nitride, where used, to rare earth oxide is not critical, although it is preferred that both, in combination, be added to SiC in molar ratio ranges of between about 3:1 and 55:1, with the ranges 3:1 to 21:1, and 3:1 to 9:1 being progressively more preferred.

Other sintering additives are not excluded. For example, adding small amounts of other sintering additives, to provide differing electrical conductivity or resistivity, or to make small variations or refinements in other properties, without fundamental change in the system, are contemplated.

The silicon carbide particles used preferably will have an average particle size of less than about 1.0 micron, more preferably less than about 0.5 microns, however, average particle sizes of up to about 5 microns can be used with higher amounts of sintering additives. Alternatively the silicon carbide can be measured so that the preferred SiC powders have average specific surface areas ranging from about 1 m²/g to about 100 m²/g. Alpha silicon carbide is the preferred form of silicon carbide although mixtures of alpha and beta silicon carbide have produced relatively high densities. The reactive, surface oxygen of the silicon carbide is an important factor in achieving the densities, fracture toughness and bend strength values in accordance with the present invention. The reactive surface oxygen content of the silicon carbide should preferably be from about 0.3 wt. % up to about 4 wt. %, based upon the weight of the silicon carbide, where the specific surface areas of the silicon carbide powders are 45 m²/g or less. Higher specific surface areas may include correspondingly greater amounts of reactive surface oxygen. The oxygen in the system may be in the form of non-crystalline Si—O compound(s) formed on the surface of the SiC powder used, or it may be reactive surface or other oxygen in any form from the nitrogen containing aluminum compound used, for example, hydrates of aluminum in either a crystalline or non-crystalline form. One type of reactive oxygen is found on the surfaces of the SiC particles which is an initial starting ingredient other types, for example, are found either on the surface or otherwise chemically bound to the AlN powder which is also an initial starting ingredient. It is also possible that there may be some reactive oxygen associated with the rare earth oxides used as initial starting ingredients. In respect to SiC, the reactive surface oxygen usually exists elementally or in the form of one or more oxide chemical states, the molecules of which are attached to the surfaces of the powder particles and are chemically or physically bound thereto; however, the reactivity of such oxide states is not great enough in degree within the system of the present invention if the crystalline form of the oxide predominates. If the consolidation of the Si—O oxide compound, on the surface of SiC, is large enough to be classified as a separate and independent powder particle, i.e., a crystalline form, it will not be sufficiently reactive to function as required in the system of the present invention. Further, separate and unbound Si—O oxide compounds, existing as impurities in, or as added to, the mixtures of the system of the present invention, are not sufficiently reactive in the system. For example, cristobalite, which is found in many SiC powders, will not react sufficiently within the system to be useful. The same is true for other SiO₂ which is found intermingled in some SiC powders as a separate particle impurity. The same is also true for SiO₂ powders which may be intentionally added to the mixtures of the system of the present invention. On the other hand, one or more Si—O compounds formed in a light layer on the surface of SiC powder particles are sufficiently reactive within the system provided they are not crystalline. The key appears to be associated with the ease of freeing the oxygen atoms from such oxide compounds, and/or from the powder particle surfaces to which those oxide compounds are attached, although this has not yet been ascertained. For oxygen in the beginning materials to be significant, it must be reactive with the REO—Al—N sintering additives within the sintering temperature range of the present invention. Additional impurities in the SiC powders can be tolerated, e.g. the impurities set forth in U.S. Pat. No. 4,123,286 as well as some metals and various carbon forms may be present; such may even improve the present invention.

Conventional processing or mixing methods can be used with the present invention. Ball milling (wet or dry), vibratory milling (such as is disclosed in U.S. Pat. No. 4,695,294, the disclosure of which is incorporated herein by reference), jet milling, attrition milling (such as is disclosed in U.S. Pat. No. 4,775,393, the disclosure of which is incorporated herein by reference), or other milling methods, which will provide a uniform blending of the ingredients as well as reduce average nominal diameter of the powder particles, all can be employed. Binders, dispersants, mixing media and lubricants may be added to make the powders amenable to conventional processing techniques. Water, heptane or acetone are preferred as fluid mixing media, although other fluid mixing media are possible. Polyvinyl alcohol, acrylic acid polymer, polyethylene and oleic acid are preferred as temporary binders, although any binder which would burn off or evaporate after shaping, without leaving a significant residue, is acceptable. If all of the initial mix component particles have an average specific surface area of greater than about 1 m²/g, the powders can be dispersed in liquid (aqueous or nonaqueous) and, for example, slip cast, to form quite complex shaped green bodies.

After mixing, the powders may also be dried by conventional techniques (e.g., by spray drying, freeze drying or air drying) to allow pressing (uniaxial or isostatic), injection molding, extrusion or other forming methods to take place. The forming methods must produce green (unfired) bodies which are at least about 40% of the theoretical density of the powder mixture, and preferably at least about 55%.

Sintering can be accomplished, for example, in conventional resistance or induction heated furnaces or by plasma firing techniques as are described in U.S. Pat. No. 4,676,940 to Kim et al. The sintering atmosphere may be either a vacuum or an inert atmosphere (inert to silicon carbide). An inert atmosphere such as argon, helium or nitrogen (N₂), is preferred. Argon and helium are preferred, as sintering atmospheres, over nitrogen inasmuch as it is well known that N₂ retards the sintering of silicon carbide and requires an increase in the sintering temperature and/or time for conventional silicon carbides to achieve equivalent densities. Either conventional heating rates or rapid heating rates, for example plasma firing, may be used.

In addition to the non-oxidizing atmosphere, the sintering can be formed using a "cover mix" in a graphite crucible. The cover mix is a blend of materials similar to the composition being sintered, such as, for example, a blend of coarse silicon carbide and aluminum and yttrium containing compounds. The use of a cover mix is common in sintering silicon carbide in order to control the decomposition or evaporation of the sintering aids. Although the term "cover mix" can apply to a specific technique, namely burying the object to be sintered in a cover mix, there are alternatives. For example, the sintering can be done in aluminum nitride crucibles or crucibles made from the silicon carbide composition to be sintered, the use of a bed mix, where a cover mix is placed on the bottom of the graphite crucible and the object to be sintered is set on top of an amount of "cover mix", the use of a seasoned graphite crucible, where the walls of the graphite crucible have become impregnated with the sintering aid or a related composition by the repeated use of the crucible in sintering, by applying a coating of the composition being sintered to the walls of the crucible, or putting a lump of AlN or a lump of sintered mix in the crucible, such as a sintered body or crushed fragments or combinations thereof such as, e.g., the use of a seasoned crucible with a bed mix.

In the examples set forth herein, the use of a bed mix of coarse SiC, aluminum nitride, and yttria or the use of a crucible made from the composition being sintered were equally preferred. The use of a coated crucible is also preferred.

Sintering temperatures in the range of about 1775° C. to about 2200° C. may be used, although a temperature range of about 1900° C. to about 2050° C. is preferred. Prolonged sintering times at the more elevated temperatures, i.e. above 2150° C., should preferably be avoided in order to minimize the possibility of exaggerated grain growth. The transient liquid phase sintering time, i.e., the time prior to the migration of the liquid phase to the triple points, should preferably be less than about 120 minutes within the sintering temperature range, more preferably less than about 60 minutes within that sintering temperature range. Typically, the mixed mode sintering is done in a range of about 1900° C. to about 2050° C. during an overall sintering time range of, for example, about 3 hours, although a two-step sintering process may be utilized where, for example, the bodies are, firstly, sintered at about 1900° C. for one hour and, secondly, at about 2050° C. for an additional one hour. As will be recognized by those skilled in the art, heating schedules may be adjusted based on a variety of factors such as furnace load, size of the pieces, etc. Ceramic bodies which have been pressureless sintered to closed porosity can optionally be subsequently hot isostatically pressed (also referred to as HIPed) to improve their density and other physical properties, as will be recognized by those skilled in the art.

Through the disclosed process, SiC bodies, having a fracture toughness greater than about 7 MPam$^{\frac{1}{2}}$, are typically produced, using sintering temperatures in a range of about 1850° C. to about 2050° C. with sintering time at temperature of about 1 to about 3 hours in an inert atmosphere. By comparison, conventional sintered silicon carbide (i.e., sintered with boron and carbon sintering additives) is typically sintered commercially at temperatures of about 2150° C. with sintering time at temperatures of approximately one-half to one hour in an argon atmosphere to produce SiC bodies having a fracture toughness typically of about 4.5 MPam$^{\frac{1}{2}}$. Conventional sintered silicon carbide has a Vickers hardness of approximately 25.5 GPa and above, while the SiC produced through the present process has a Vickers hardness of approximately 21.0 GPa. The brittleness of materials can be defined by a brittleness index which is calculated by dividing the Vickers hardness, in GPa, by indentation toughness in MPa$^{\frac{1}{2}}$. The brittleness index of conventional sintered silicon carbide is in range of about 8 to $9 \times 10^3$/M$^{\frac{1}{2}}$. On the other hand, the brittleness index of the material of the present invention, mixed mode sintered silicon carbide, is in a range of about 4 to $5 \times 10^3$/m$^{\frac{1}{2}}$, indicating a significantly less brittle material. Conventional sintered silicon carbide has a bend strength which normally does not exceed about 55 ksi, based on the four-point bend method, while the SiC produced by the present process has a typical bend strength in the range of 60–75 ksi and even significantly higher when it is two-step sintered and/or post HIPed.

The invention is further clarified by the following examples, which show that the silicon carbide product of the present invention achieves high toughness and exhibits good strength, corrosion resistance, erosion resistance and oxidation resistance.

EXAMPLE 1-29

In these examples, as shown in Table I, various amounts of alpha silicon carbide supplied by various commercial producers, as well as one commercially available form of beta silicon carbide, having average particle sizes of less than one micron and varying surface oxygen contents are used. Such SiC was put into mixing containers along with various amounts of aluminum nitride powder, supplied by Denka K. K. and Alcan Aluminum, and other powders of nitrogen containing aluminum compounds, and various amounts of yttria, supplied by Molycorp (and in one case CeO$_2$ and in another case La$_2$O$_3$), and a liquid medium such as water, heptane or acetone, and mixed by various milling techniques. The raw batch weight of the powder mixtures, before adding the liquid media, was typically 600 grams, however, this was varied. The amount of liquid medium was typically 1400 grams, however, this also was varied. The percents by weight stated in Table I are based on the weight of the raw batch. When the powders for these examples were mixed in the vibratory mill, they were added to a SWECO Mill container, such as is described in U.S. Pat. No. 4,695,294, loaded with SiC grinding media along with distilled water, which was operated for 4 hours. When the powders for these examples were ball milled, the mixture was added to a ball milling container along with silicon carbide grinding media, which was operated for 24 hours. When the powders for these examples were attrition milled, they were placed in an attrition mill, such as is described in U.S. Pat. No. 4,775,393, along with silicon carbide media and water, which was then operated for about one hour. Next, the mixtures for these examples were sieved through a 400 Tyler mesh screen into a large container. For most examples, to the sieved slurry, which includes 600 grams of raw powder batch, was added, a binder solution made from 36 grams of an acrylic acid polymer, namely Rikabond ® FK-10 resin and Acrysol ® WS-50 resin, such as is commercially available, dissolved into 120 grams of distilled water, and the mixture was stirred for 1 hour. The amount of the binder can be varied, in terms of the amount added to distilled water to form the binder solution, as long as the purpose of the binder, i.e., holding the powder together in the subsequent forming step, is fulfilled. The solution then was spray dried and sieved through an 80 Tyler mesh screen. In one instance, the powder was freeze dried instead. Except for Example Nos. 2, 3, 4, 14A and 21, the dried and screened powder was then pressed into test shapes or green bodies, in particular square plates having a dimension of approximately 64 mm by 64 mm by 8 mm thickness, and pucks, having a diameter of approximately 25 mm diameter by 6 mm thickness. Except for Example Nos. 3, 4, 14A and 21, these green bodies were formed by uniaxially pressing the screened and dried powder into steel molds, followed by cold isostatic pressing to shape at 100 MPa to form green bodies.

The green bodies were then sintered in argon gas at 1900° C. for 3 hours, unless otherwise indicated, in either a model 10003560PP laboratory sintering furnace or a Model HTG-14–25 production sintering furnace, both of which are manufactured by Astro Industries, Inc. The final sintered bodies were then measured to determine their bulk densities, which have been reported as a percent of the theoretical density.

TABLE I

| Example No. | SiC[1] Source | AlN % by wt | Y2O3 % bt wt | Mixing[2] | Mixing Media | Temp. Binder[4] | % of Theoretical Density | Fracture Toughness[3] $K_{1c}$ | Four Point Bend Strength[3] ksi |
|---|---|---|---|---|---|---|---|---|---|
| 1A | A | 2.5 | 2.0 | BM | Water | AA | 97.1 | 8.0 | 63.8 |
| 1B | A | 2.5 | 2.0 | BM | Water | AA | 97.1 | 9.0 | 72.0 |
| 1C[9] | A | 2.5 | 2.0 | BM | Water | AA | 100.0 | N.A.[12] | 82.4 |
| 2 | A | 2.5 | 2.0 | BM | Dry[7] | PE[11] | 97.0 | 10.6 | 65.5 |
| 3 | A | 2.5 | 2.0 | BM | Water | None[5] | 100.0 | N.A. | 93.7 |
| 4 | A | 2.5 | 2.0 | BM | Water | None[5] | 100.0 | N.A. | 74.8 |
| 5 | A | 2.5 | 2.0 | VM | Water | AA | 97.7 | 9.6 | 48.3 |
| 6 | A | 2.5 | 2.0 | VM | Heptane | OA | 97.4 | 9.4 | 50.0 |
| 7 | B | 2.5 | 2.0 | VM | Water | AA | 91.4 | 11.2 | 62.7 |
| 8[6] | B[9] | 2.5 | 2.0 | VM | Water | AA | 98.8 | 12.4 | 71.0 |
| 9 | A | 2.5 | 4.0 | VM | Water | AA | 99.9 | 8.8 | 52.8 |
| 9A[9] | A | 2.5 | 4.0 | VM | Water | AA | 99.9 | 12.0 | 75.6 |
| 10 | A | 5.0 | 3.0 | VM | Water | AA | 99.3 | 10.1 | 52.1 |
| 10A[9] | A | 5.0 | 3.0 | VM | Water | AA | 100.0 | N.A. | 85.9 |
| 11 | A | 10.0 | 8.0 | VM | Water | AA | 99.9 | 8.3 | 62.7 |
| 12 | A | 10.0 | 6.0 | VM | Water | AA | 100.0 | 8.6 | 60.9 |
| 13 | A | 10.0 | 0.0 | VM | Water | AA | 61.7 | N.A. | N.A. |
| 14 | A | 2.5 | 0.0 | VM | Water | AA | 81.0 | N.A. | N.A. |
| 14A | A | 2.5 | 0.0 | VM | Water | AA[5] | 100.0 | 4.4 | N.A. |
| 15 | A | 0.0 | 8.0 | VM | Water | AA | 69.0 | N.A. | N.A. |
| 16 | A | 5.0 | 8.0 | VM | Water | AA | 100.0 | 11.4 | 67.6 |
| 17 | A | 1.5 | 1.5 | VM | Water | AA | 98.5 | 9.4 | 67.7 |
| 18 | A | 2.5 | 2.9[8] | BM | Water | AA | 95.3 | 7.3 | 60.2 |
| 19 | A | 2.5 | 2.0 | AM | Water | AA | 96.9 | 9.6 | 58.7 |
| 20 | A | 2.5 | 2.0 | AM[10] | Water | AA | 97.4 | 8.2 | 49.0 |
| 21 | A | 0.0 | 2.0 | VM | Water | AA[5] | 92.0 | 3.1 | N.A. |
| 22 | A | 2.5 | 1.5[13] | BM | Water | AA | 97.7[14] | 9.4 | 55.9 |
| 23 | C | 2.5 | 2.0 | BM | Acetone | AA | 96.8[15] | N.A. | N.A. |
| 24 | A | 2.5 | 2.0 | BM | Water | AA | 92.2[16] | N.A. | N.A. |
| 25 | A | 2.5 | 0.25 | BM | Water | AA | 96.0[14] | 8.9 | 66.0 |
| 26 | A | 3.5[17] | 2.0 | BM | Water | AA | 97.6[14] | N.A. | N.A. |
| 27 | A | 2.7[18] | 2.0 | BM | Water | AA | 97.2[14] | N.A. | N.A. |
| 28 | A | 2.8[19] | 2.0 | BM | Water | AA | 99.7[14] | N.A. | N.A. |
| 29 | D | 5.0 | 3.0 | BM | Water | AA | 97.3 | N.A. | N.A. |

[1] A = LONZA UF15 SiC Powder; B = Carborundum SiC Powder; C = LONZA UF45 SiC Powder; D = 80% LONZA UF15; 20% Ibiden Betarundum Ultrafine
[2] BM = Ball Milled; VM = Vibratory Milled; AM = Attrition Milled
[3] Measured at Room Temperature
[4] AA = Acrylic Acid Polymer; PE = polyethylene; OA = Oleic Acid
[5] Made by Hot Pressing after Ball Milling
[6] Milled 17 Hours
[8] $La_2O_3$ is used to replace $Y_2O_3$
[9] Post HIPed
[10] Freeze Dried
[11] Made by Injection Molding
[12] N.A. Means Not Available
[13] $CeO_2$ is used to Replace $Y_2O_3$
[14] Sintered at 1900° C. For 1 Hour, then at 2050° C. For 1 Hour
[15] Sintered at 1775° C. For 3 Hours
[16] Sintered at 2200° C. For 30 Minutes
[17] AlON is used to Replace AlN
[18] 21R Polytype (6 AlN.SiO2) is used to Replace AlN (monomorph 2H type)
[19] Used 1.25 AlN + 1.55 $Al_2O_3$ Although the invention has been demonstrated using a pressureless sintering process, other and/or additional furnacing or processing can be utilized. In some instances, the sintered samples subsequently were subjected to a post HIPing step, i.e., the already sintered specimens, were heated to 2000° C. for one-half hour at 30 ksi argon pressure, but without being canned, i.e., encapsulated in glass or other coating. The results show that some further densification can be achieved and improvement in fracture toughness can be achieved. Example Nos. 3 and 4 were hot pressed.

The fracture toughness ($K_{1c}$) of the specimens was measured, at room temperature, by the single edge notched beam test (SENB) using the four point bend method which is well known to those with skill in the art. Fracture toughness is reported in the unit $MPam^{\frac{1}{2}}$. After cutting the standard notch in the beam, the specimen was annealed by placing it in a electrically heated furnace, in air, at 900° C. for six hours. In this test, the specimen measures 3.2 mm by 6.4 mm by 51 mm and is transversely notched across the 3.2 mm wide face to a depth of 2.5 mm and a width of 0.5 mm. The support span of the four point bend fixture is 38.1 mm by 19.1 mm. The crosshead speed of the testing machine is 0.51 mm per minute. In addition, the bend strength of unnotched specimens was measured by the same four point bend test, at room temperature, using the same size specimens as those used for the SENB tests, but without the notches. For the four-point bend test, the force is applied to the 6.4 mm wide face of the specimen. The bend strength is reported as an average value and the unit is kilopounds per square inch or ksi. The equipment used for both the SENB tests and the four-point bend tests was a MTS Model 810 Material Testing System. The results are reported in Table I.

The results shown in Table I show that a variety of mixing processes can be employed. Those results also show that the mixing can be done in a variety of mixing media fluids.

In order to further demonstrate the performance of a SiC product made in accordance with the present invention, a sample similar to Example No. 5 was subjected to corrosion, erosion and oxidation tests.

The corrosion test is performed in accordance with ASTM (American Society for Testing Materials) procedure G31-72 (Reapproved 1985) which is incorporated herein by reference as applied to ceramic materials. In the test, a ceramic sample is immersed in a corrosive liquid, normally 52% HF solution or in a combination of 10% HF with 57% $HNO_3$, for 500 hours at room temperature, and the weight change of the specimen, from before the immersion until after its removal, is the measurement of corrosion. A sample based upon Example No. 5 showed a weight loss of 10 milligrams per square centimeter per year, in 10% HF plus 57% $HNO_3$ solution, which is comparable to conventional SiC sintered with boron and carbon sintering additives.

The erosion test was done in accordance with ASTM procedure G76-83 (Reapproved 1989) which is incorporated herein by reference as applied to ceramic materials, which involves solid particle impingement using gas jets using $Al_2O_3$ as the erodant, 90° as the angle of impingement, and at a pressure of 40 psi. The volume loss over time, usually up to 10 minutes, was measured and the product in accordance with the present invention (Example No. 5) showed a volume loss, after 10 minutes of exposure, of about 0.001 $cm^3$, which is excellent compared to usual values for $Si_3N_4$ of about 0.0035 $cm^3$, conventional SiC (with B-C sintering additives) of about 0.002 $cm^3$, and cemented tungsten carbide (WC) of about 0.0005 $cm^3$.

The oxidation test was conducted in accordance with a common procedure (there being no standard test) in which a sample (in this case based upon Example 5) is placed inside a furnace and kept at various temperatures and for various times in static air. The temperatures, times and weight gains per unit of surface area (milligrains per square centimeter) are shown below in Table II along with comparisons for conventional SiC (with B—C sintering additives) and SiAlON:

TABLE II

| Temperature/ Time | Weight Gain ($g/cm^2$) | | |
|---|---|---|---|
| | SiC (with B-C Additives) | SiAlON | Present Invention |
| 1093° C./8 Hrs | 0.0155 | 0.0155 | 0.0103 |
| 1093° C./24 Hrs | 0.0362 | 0.0413 | 0.0155 |
| 1371° C./8 Hrs | 0.0207 | 1.1160 | 0.1395 |
| 1371° C./24 Hrs | 0.0672 | 1.4622 | 0.1911 |

The test results reported in Table III (some of which are reported in Table I) indicate that a silicon carbide product in accordance with the present invention can be made form a variety of powders, having varying oxygen contents, including powders to which separate powder particles of silicon dioxide are added. The formulations used in Table III are the same as Example No. 5 in Table I. The sintering temperatures and times used were 1900° C. for 3 hours unless otherwise indicated. The SiC powders in which the reactive surface oxygen has come from the manufacturing process are preferred although, with added silica, as in Examples Nos. 33, 33a, 33B, 34 and 34A shown in Table III, good results can be obtained with a two-step sintering process or by post HIPing, however, they also show that good physical properties do not develop at sintering temperatures of 1850° C. and 1900° C.

As can be seen from both Table I and Table III, fracture toughness values above 7 MPam½ can consistently be achieved, and where the surface oxygen content of the SiC starting powder was more than about 1.0% by weight, the fracture toughness was, typically, in excess of about 9 MPam½.

TABLE III

| Example | $SiC^1$ Powder | Specific Surface Area $m^2/g$ | Oxygen % by Weight | $SiO_2$ % by $Weight^3$ | $SiO^2$ Source | Fracture % of Theoretical Density | $Toughness^2$ $K_{1c}$ MPam½ | Four Point Bend $Strength^2$ ksi |
|---|---|---|---|---|---|---|---|---|
| 7 | B | 10.4 | 0.35 | 0.66 | As Recd. | 91.4 | 11.2 | 62.7 |
| $8^7$ | B | 10.4 | 0.35 | 0.66 | As Recd. | 98.8 | 12.4 | 71.0 |
| 30 | C | 16.5 | 1.13 | 2.13 | As Recd. | 97.3 | 10.1 | 64.9 |
| 5 | A | 15.0 | 1.37 | 2.60 | As Recd. | 97.7 | 9.6 | 48.3 |
| 19 | $A^4$ | 15.0 | 1.37 | 2.60 | As Recd. | 96.9 | 9.6 | 58.7 |
| 31 | D | 32.0 | 2.4 | 4.56 | As Recd. | 99.3 | 10.1 | 59.1 |
| 32 | E | 45.0 | 3.9 | 7.4 | As Recd. | 97.6 | 10.5 | 69.5 |
| 33 | B | 10.4 | 1.37 | 2.60 | $Added^5$ | 92.0 | N.A. | 44.2 |
| 33A | $B^6$ | 10.4 | 1.37 | 2.60 | $Added^5$ | 95.1 | 10.6 | 72.4 |
| 33B | $B^7$ | 10.4 | 1.37 | 2.60 | $Added^5$ | 97.9 | N.A. | N.A. |
| 34 | $B^9$ | 10.4 | 1.37 | 2.60 | $Added^8$ | 92.6 | 5.9 | 37.4 |
| 34A | $B^7$ | 10.4 | 1.37 | 2.60 | $Added^8$ | 97.4 | 9.0 | 68.2 |

[1] A = Lonza UP-15 SiC Powder; B = Carborundum SiC Powder; C = Showa Denko A-1 SiC Powder; D = Lonza UF-32 SiC Powder; and E = Lonza UF-45 SiC Powder
[2] Measured at Room Temperature
[3] Includes reactive, surface oxygen, calculated from the measured oxygen in the SiC powder.
[4] Attrition Milled
[5] $SiO_2$ Having a Particle Size of About 1-2 Microns added to existing surface $SiO_2$ from the SiC powder
[6] Post HIPed
[7] Sintered at 1900° C. For 1 Hour, Then at 2050° C. For 1 Hour
[8] Colloidal $SiO_2$ Having a Particle Size of About 0.01 Micron
[9] Sintered at 1850° C. For 3 Hours The process of the present invention produces surprising and new sintering phenomena. As the formed green body initially reaches sintering temperature, a transient liquid phase develops which "wets" the particles of SiC. This wetting of the SiC particles and the flow of the transient liquid phase rearranges the particles of SiC in the forming microstructure such that they are in substantially greater intimate contact with each other than what had been the situation in the green body. The body is densified at an early stage and the fine-grain morphology of the microstructure evolves as the early high degree of densification inhibits large or exaggerated grain growth.

The transient liquid phase evolves from high temperature chemical reactions between and among the rare earth oxide(s), the nitrogen containing aluminum compound(s) and the surface oxygen within the system to form, for example, one or more eutectics. For example, YAG YAP and/or YAM may be formed as well as other compounds such as $Y_2Si_3O_3N_4$, $Y_{10}(SiO_4)_6N_2$ and/or $Y_3Si_3O_6N_3$. It is believed that the transient liquid phase moves by capillary action and surface tension phenomena, carrying the grains with it as it moves resulting in particle rearrangement and early densificaiton.

The grains do grow in the microstructure, from the initial size of the grains in the beginning SiC powder to somewhat larger grains, which is necessary for strong sinter bonding. But, contrary to the situation in solely solid state diffusion sintering, as found in conventional SiC—B—C systems, grain growth and grain bonding are not the only prominent mechanisms for densification. Rather, densification also initially occurs by SiC particle rearrangement, followed by modest grain growth densification with a high degree of grain bonding which occurs as the transient liquid phase is reacted and migrates to the triple points formed by the adjacent corners of the SiC grains in the microstructure; then solid state diffusion sintering takes over wherein there appears to be a second stage of modest grain growth producing a grain size which is predominately up to about 5 microns.

Al and N atoms diffuse into the internal crystalline structures of each SiC grain, and the liquid phase migrates to the triple points where it solidifies and is crystallized into a discontinuous crystalline second phase which is bound at the triple points, with the SiC. The balance of the grain boundaries which are not part of the triple points are relatively clean with most impurities being observed at the triple points and trapped there in the crystalline second Phase crystalline structures which have developed. Thus, the bonds formed directly between the SiC grains, i.e., those grain boundaries which are remote from the triple points, appear to be relatively free of flaws, strains and other imperfections, although there is some evidence of discrete, intermittent residual traces, in the range of 3-5 Angstroms in size, of the elements of the sintering additives which can be found along those grain boundaries, but not in a crystalline state differing from SiC. The SiC—SiC bonds in the grain boundaries have been observed to comprise at least 50% structural inter-grain lattices and, at many points, it was noted that these structural lattices formed at least 80% of such bonding.

During the migration of the transient liquid phase, solid state diffusion sintering between and among the SiC particles begins and proceeds while the crystalline second phase is developing at the triple points. It is believed that this second phase may not actually crystallize until the material commences to cool from the final sintering temperature. Optionally, the sintering temperature can be increased by about 100° C. to about 150° C. above the initial sintering temperature, at this point, to further enhance the solid state diffusion sintering which is occurring, as sufficient densificaiton and SiC particle rearrangement has already occurred to inhibit exaggerated grain growth. This two-step sintering tends to enhance physical properties in the final sintered body.

The Al and N, which diffuse into the internal crystalline structure of each SiC grain, tend to associate with silicon atoms to dope the SiC crystals, forming p-type or n-type dopants. In other words, it can be said that, for aluminum, a p-type conductivity (positive charge) is formed as follows: $Si^{4e}C + Al^{3e} = Si^{4e}C(Al) + 1$ electron hole. Also, it can be said that, for nitrogen, an n-type conductivity (negative charge) is formed as follows: $Si^{4e}C + N^{5e} = Si^{4e}C(N) + e$. It has been noted that the concentration of aluminum (associated with silicon) in the SiC crystals is about $10^{19}$ atoms/cm$^3$ with the larger amounts tending to be concentrated nearer to the grain boundaries but still within the SiC crystals. It has also been noted, on the other hand, that the concentration of nitrogen (associated with silicon) in the SiC crystals is about $\geq 10^{19}$ atoms/cm$^3$ and that the distribution tends to be quite uniform throughout the SiC crystals. Both the aluminum and the nitrogen within the silicon carbide crystals are in the form of carrier concentrations and not as the solid state solutions disclosed by U.S. Pat. No. 4,569,922 to Suzuki. The doping of the silicon carbide crystals comprises the basis for the electrical conductivity of the material of the present invention, and that electrical conductivity may be directly controlled by controlling the amounts of aluminum and nitrogen introduced into the system. Electrical resistivity values at room temperature of less than 1000 ohm cm are typical, yet the range of readily controllable electrical resistivity values is about 0.2 to about 10,000 ohm cm. Surprisingly, the existence of the second phase does not have any significant impact on the electrical conductivity of the material or the ability to control that electrical conductivity, a further indication that the second crystalline phase is discontinuous and that the grain boundaries between the SiC grains are predominantly clean and quite conductive (without insulating impurities). The transient liquid phase is formed by a high temperature chemical reaction which can be generally characterized as follows:

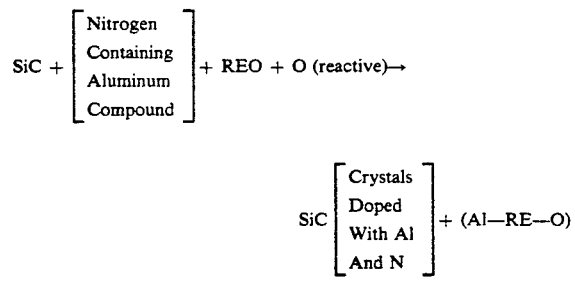

In the above characterization, it is not clear exactly what intermediate reactions might occur or what the exact mechanism of the chemical reaction is, however, what goes into the reaction is quite clear, as shown on the left side of the characterization, and it is quite clear what the ultimate result is, from analysis of the final sintered body, as shown on the right side of the characterization. Those elements indicated as "possible" in the above characterization may or may not exist as separate elements or in any combination.

Referring to FIG. 1, it is highly probable that the transient liquid phase does occur within the sintering temperature range of the present invention. From the evidence of residual trace amounts of sintering additives found in the SiC —SiC grain boundaries, it is highly probable that extensive wetting of each SiC grain has occurred during sintering. Further, the microstructures and densification of specimens which were sintered at low sintering temperatures, i.e. 1775° C. to 1800° C., for a relatively short period of time, e.g., one-half hour, were examined. Very early significant densification was noted as well as quite advanced formation of fine-grain microstructures, but without substantial development of potential physical properties, indicating that SiC grains are moving in the structure, aligning themselves more intimately with each other without exaggerated grain growth, but that strong bonding of the system had not yet occurred. However, also noted was the phenomena of modest crystalline grain enlargement at this early transient liquid phase stage, producing grain sizes in the range of up to about 3 to 4 microns. The deduction is that the transport mechanism for the SiC grain movement is the formation of a liquid phase and the consequent wetting and consolidation of the SiC grains.

Additional evidence of liquid phase formation during sintering was studied by using a high temperature dilatometer, Model 1611-SX-21 "Unitherm" manufactured by Anter Laboratories, which could be inserted into the graphite-lined Astro laboratory sintering furnace mentioned previously and used for the experiment. This dilatometer allowed simultaneous recording of shrinkage, shrinkage rate and sample temperature as a function of time. Sample shrinkage started as low as about 1050° C. Shrinkage rates increased steadily beginning at about 1200° C. and reaching maxima at temperatures between 1780° and 1880° C. In cases where high amounts of sintering aids were used, e.g., 10 wt % AlN and 8 wt % $Y_2O_3$, the shrinkage rate increased substantially, e.g., more than doubled while still reaching relative maxima within the same temperature range. After reaching these maxima, the shrinkage rate showed rapid decrease indicating other densification mechanism taking over in the final stage of sintering.

The concentration of aluminum and nitrogen within the silicon carbide crystals, in samples similar to Example Nos. 1A and 9A in Table I, was determined by using ion implant standards. The levels were quantified from a 60 micron diameter section of a polished specimen. The method used was Secondary Ion Mass Spectroscopy (SIMS) mapping. This method was also used to determine that the rare earth materials, from REO, did not show up internally in the silicon carbide crystals, nor did they show up in significant amounts at the silicon carbide grain boundaries except at the triple points. The SIMS instrument used was a Cameca IMS-3f ion microscope and a 10 keV $O^-$ primary ion beam was used to sputter the sample surfaces. A 60 micron image field was used to enable clear resolution and distinction of the aluminum, and in particular the nitrogen from $Si^{2+}$ and possible traces of $CH_2$. The images were acquired digitally and transferred to a Gould imaging system for annotation and printing.

Another technique used to analyze and characterize the silicon carbide grain boundaries and triple points, in samples similar to Example Nos. 1A and 9A in Table I, is X-ray Photoelectron Spectroscopy (XPS). Because of the propensity of the material, according to the present invention, to fracture substantially intergranularly (rather than transgranularly as is common for conventionally sintered SiC—B—C Systems), the grain boundaries are highly exposed, facilitating relatively easy study. The equipment used was a PHI 5400 XPS instrument using a $MgK_{alpha}$ X-ray source. The samples were fractured under a vacuum of $10^{-9}$ torr and transferred directly to the analysis chamber to prevent any change in composition of the fracture from pick-up of contamination from air on the fracture surfaces. All of the samples were gold coated, except for the fracture surfaces, to prevent any signals except from those fracture surfaces. Using a Scanning Electron Microscope (SEM), it was determined that greater than 90% of the fracture surface areas exhibited intergranular fractures, with less than 10% exhibiting transgranular fractures. The analysis area for XPS was 1 mm in diameter. Wide energy scans were initially used for element identification followed with narrow energy scans to acquire quantification of the elements present.

A Scanning Auger Microprobe (SAM) analysis was made of fracture surfaces using a PHI 660 instrument, using a 10 keV electron beam with typical operating currents of 0.1 nA for SEM micrographs and 40.0 nA for Auger images and spectra. The Auger images were 170×170 pixel arrays. Images were background subtracted but uncorrected for topography, while spectra were displayed in a derivative mode to enhance the visibility of small peaks.

Secondary and backscattered electron images of polished specimens were derived using a AMRAY 1645 Scanning Electron Microscope (SEM). The images were collected with an accelerating voltage of 20 kV. Backscattered electron images, which are sensitive to average atomic number and localized density, were used to monitor the presence and distribution of reactive metals in the secondary crystalline phase at the triple points and grain boundaries, utilizing a lateral spatial resolution of less than 0.1 micrometers. Secondary electron images, which are sensitive to surface morphology, produced information about relative porosity with a nominal spatial resolution of 100 Angstroms.

A dedicated Scanning Transmission Electron Microscope manufactured by Vacuum Generators (VG STEM) was used to characterize compositional and structural information with high spatial resolution. The VG STEM was operated at 100 kV accelerating voltage with a vacuum in the sample chamber of $10^{-9}$ mbar. Compositions were determined using a KEVEX ultra-thin window energy dispersive x-ray detector attached to the VG STEM. Compositions within silicon carbide grains, at triple points, and along grain boundaries were studied using both single point analysis and Energy Dispersive X-ray Spectroscopy (EDS) mapping (typically at 128×64 pixel resolution). For single point compositional analysis, the spatial resolution was varied somewhat, with the variations of local thickness and composition of the sample, because of the scattering of the electron beam a it passes through the sample. For most analyses, the primary electron beam size was about 2 nanometers and spatial resolution was less than 10 nanometers allowing for scattering. Electron diffraction in the VG STEM was used to determine that substantially all of the secondary phases at the triple points are crystalline.

Transmission Electron Microscopy (TEM) was done, using a JEOL 4000EX High Resolution Electron Microscope (HREM). This instrument was operated at an accelerating voltage of 400 kV and has a nominal resolution of 1.8 Angstroms. It was used for high resolution imaging of SiC polytype grains, grain boundaries, triple point phases, flaws, defects and unit cell faults. An associated technique, known as Optical Diffraction (OD), utilizes a laser optical bench to obtain optical diffraction patterns from selected areas of lattice fringes or periodic atomic arrays, was used in conjunction with electron diffraction and direct measurement of lattice spacings to identify crystalline phases. No 2H polytype structures were noted, indicating an absence of any SiC—AlN solid solution.

In utilizing the TEM techniques with the HREM, to study samples similar to Examples Nos. 1A and 9A of Table I, it was noted that greater than 50% of the grain boundaries, between the SiC grains in the microstructures of the specimens studied, ranging up to about 80% of those grain boundaries, were clean, showing no traces of flaws, imperfection, contamination or second crystalline phases, although some discrete residual traces of the elements of the sintering additives in non-crystalline form were noted in the grain boundaries by VG STEM. The ultimate magnification level of the HREM exceeds 500,000, but it would not note traces of materials less than about 5 Angstroms in size. The coordination, study and comparison of VG STEM, SIMS, EDS and SAM results clearly distinguish the presence of Al and N within the internal crystalline structure of the SiC grains and distinguished from presence of those elements in the grain boundaries and triple points and also the presence of crystallized RE—Al—O and, in some cases, RE—Al—I—N—C at the triple points. In particular, electron microscopy observations, including both HREM lattice imaging and VG STEM small area electron diffraction patterns show that the second phases in the triple points are definitely crystalline and not amorphous (glassy). X-ray diffraction techniques confirm this. The detailed analysis done by the application of electron microscopy with EDS and the coordination comparison therewith with the results of the application of the SIMS techniques, to analyze the triple point second phase, indicates the existance therein of YAM, YAG and YAP by clearly establishing the existence, in that second phase, of Y, Al and O. This also was confirmed by X-ray diffraction analysis.

TEM and HREM results indicate that many individual SiC grains exhibit crystalline polytype stacking faults, with associated strain, within the polytype structure, e.g. 6H polytype. It is possible that these stacking faults and their associated strain patterns may contribute to, or establish a system of, discrete toughening within such grains.

In analyzing the SiC—SiC grain boundaries, it has been determined by HREM techniques that over 50% and, in some cases, over 80% of the SiC—SiC grain boundaries, but not the triple points, exhibit structural SiC—SiC lattice contacts formed therebetween with no evidence of secondary phases, crystalline or otherwise, that can be detected by this technique. HREM will detect materials which are 5 Angstroms or larger and will produce magnification levels in excess of 500,000. The structural SiC—SiC lattice contacts observed are larger than 5 Angstroms since they can be detected by the HREM.

VG STEM applications of EDS techniques, on the other hand, can detect the presence of substances which are as small as 3 Angstroms. Through the application of such techniques, discrete and separated points of trace residual amounts of elements contained in the initial sintering additives have been noted, but on an atomic or isolated molecule basis and definitely not in the crystalline form and definitely discontinuous.

Unit cells of crystalline YAP, YAM and YAG have a size of 11-12 Angstroms, however, to qualify as crystals, such unit cells must be arranged in a long range order including multiples of the individual unit cells. The unit cell size of 6H polytype SiC has a size of 15 Angstroms, but also requires multiples of such unit cells to be arranged in a long range order to qualify as a crystal. Since the HREM was unable to detect anything other than SiC at the clean grain boundaries, and because there is no known crystalline structure, which could be formed by the elemental constituents of the system of the present invention and which approaches a size of 5 Angstroms of less, it has been deduced that there is no crystalline second phase in the SiC—SiC grain boundaries.

The foregoing analytical techniques and equipment are well known to those skilled in the art but infrequently applied to silicon carbide ceramic materials due to their high cost.

Although the present invention has been described with respect to preferred embodiments, it is to be understood that various modifications may be employed without departing form the concept of the invention which is defined by the following claims.

What we claim is:

1. A process for producing a sintered silicon carbide ceramic body having superior fracture toughness comprising:
    a) forming a homogeneous mixture comprising:
        1) one or more nitrogen containing aluminum compounds in an overall amount of from 0.5 weight percent to about 15 weight percent, based upon the total wight of the mixture;
        2) one or more rare earth oxides in an overall amount of from about 0.1 weight percent and 15 weight percent, based upon the weight of the mixture;
        3) silicon carbide, in an amount of from about 70 weight percent to about 99.4 weight percent, based on the weight of the mixture, and having a specific surface area of from about 1 to about 100 square meters per gram; wherein said mixture includes more than 0.01 weight percent, to about 10 weight percent, of either non-crystalline reactive oxygen from the surface of said silicon carbide or reactive oxygen in any form from said one or more nitrogen containing compound and/or from said one or more rare earth oxides, or both said reactive oxygen being in elemental or in a compound or both;
    b) combining said mixture with a temporary binder;
    c) forming the mixture and binder in such a way as to produce a shaped object; and
    d) firing the shaped mixture under such conditions of time and temperature in an atmosphere inert to silicon carbide or in a vacuum at a temperature of between about 1775° C. and about 2200° C. until a sintered ceramic body having a predominantly homogeneous, predominantly equiaxed and predominantly fine-grain microstructure is formed having a fracture toughness, as measured by the single edge notched beam test, of at least 7 MPam$^{\frac{1}{2}}$.

2. The process according to claim 1 wherein said fracture toughness is at least 8 MPam$^{\frac{1}{2}}$.

3. The process according to claim 1 wherein said fracture toughness is at least 9 MPam$^{\frac{1}{2}}$.

4. The process according to claim 1 when said shaped object is fired in an argon atmosphere.

5. A process according to claim 1 when the silicon carbide of said mixture is predominantly alpha, non-cubic crystalline silicon carbide.

6. A process according to claim 1 when the silicon carbide of the sintered composite body is predominantly alpha, non-cubic crystalline silicon carbide.

7. A process according to claim 1 wherein said mixture further includes a lubricant.

8. A process according to claim 1 wherein said sintered body has achieved at least about 95 percent of theoretical density.

9. A process according to claim 1 wherein said sintered body has achieved at least about 98 percent of theoretical density.

10. The process according to claim 1 wherein said one or more nitrogen containing aluminum compounds are in an overall amount of from 0.5 weight percent to 10 weight percent.

11. The process according to claim 1 wherein said one or more rare earth oxides are in an overall amount of from 0.1 weight percent to 8.0 weight percent.

12. The process according to claim 1 wherein said one or more nitrogen containing aluminum compounds are in an overall amount of from 1.5 weight percent to 10 weight percent.

13. The process according to claim 1 wherein said one or more rare earth oxides are in an amount of from 0.25 weight percent to 8.0 weight percent.

14. The process according to claim 1 wherein the molar ratio, of said one or more nitrogen containing aluminum compounds to said one or more rare earth oxides, is between 3 and 55.

15. The process according to claim 1 wherein the molar ratio, of said one or more nitrogen containing aluminum compounds to said one or more rare earth oxides, is between 3 and 21.

16. The process according to claim 1 wherein the molar ratio, of said one or more nitrogen containing aluminum compounds to said rare earth oxides, is between 3.4 and 9.2.

17. A process according to claim 1 wherein said sintered body is subject to a further HIPing treatment under gas pressure at about 2000° C. for a period of about 0.5 hour.

18. A process according to claim 1 wherein said homogeneous mixture is combined by vibratory milling said components for about 4 hours.

19. A process according to claim 1 wherein said homogeneous mixture is combined using distilled water.

20. A process according to claim 1 wherein said homogeneous mixture is combined using heptane.

21. A process according to claim 1 wherein said homogeneous mixture is combined by ball milling.

22. A process according to claim 1 wherein said homogeneous mixture is combined by attrition milling.

23. A process according to claim 1 wherein said mixture is spray dried before being formed to produce a shaped object.

24. A process according to claim 1 wherein said one or more nitrogen containing aluminum compounds are selected from the group consisting of aluminum nitride, aluminum oxynitride, aluminum carbonitride and/or aluminum oxynitride spinel.

25. A process according to claim 1 wherein said one or more nitrogen containing aluminum compounds comprises aluminum nitride.

26. A process according to claim 1 wherein said reactive oxygen is surface oxygen from the surface of said silicon carbide and is present in an amount of up to 8.0 weight percent upon the weight of the silicon carbide.

27. A process according to claim 1 wherein said reactive oxygen is surface oxygen from the surface of said silicon carbide and is present in an amount of up to 4.0 weight percentbased upon the weight of the silicon carbide.

28. A sintered silicon carbide ceramic body derived from a uniform mixture comprising from about 70 weight percent to about 99.6 weight percent of silicon carbide, from about 0.5 weight percent to about 15 weight percent overall of one or more nitrogen containing aluminum compounds, and from about 0.1 weight percent to about 15 weight percent overall of one or more rare earth oxides, all based upon the weight of the mixture, wherein said sintered ceramic body has a density of 2.9 g/cm$^3$ or greater, a fracture toughness, as measured by the single edge notched beam test, of at least 7 MPam$^{\frac{1}{2}}$, has a predominantly equiaxed, predominantly homogeneous and predominantly fine-grain microstructure with a discontinuous crystalline second phase located predominantly at the triple points of silicon carbide grains.

29. A sintered silicon carbide ceramic body in accordance with claim 28 wherein said fracture toughness is at least 8 MPam$^{\frac{1}{2}}$.

30. A sintered silicon carbide ceramic body in accordance with claim 28 wherein said fracture toughness is at least 9 MPam$^{\frac{1}{2}}$.

31. A sintered silicon carbide ceramic body in accordance with claim 28 wherein said one or more nitrogen containing aluminum compounds are selected from the group consisting of aluminum nitride, aluminum oxynitride, aluminum carbonitride, and/or aluminum oxynitride spinel.

32. A sintered silicon carbide ceramic body in accordance with claim 28 wherein said one or more nitrogen containing aluminum compounds are aluminum nitride.

33. A sintered silicon carbide ceramic body in accordance with claim 28 wherein said one or more nitrogen containing aluminum compounds are in an overall amount of from 1.5 weight percent to 10 weight percent.

34. A sintered silicon carbide ceramic body in accordance with claim 28 wherein said one or more rare earth oxides are in an overall amount of from 0.1 weight percent to 8.0 weight percent.

35. A sintered silicon carbide ceramic body in accordance with claim 28 wherein said body has a room temperature electrical resistivity of less than 1000 ohm cm.

36. A sintered silicon carbide ceramic body in accordance with claim 28 having a microstructure which exhibits predominantly clean grain boundaries between adjacent grains of silicon carbide.

37. A sintered silicon carbide ceramic body having a predominantly fine-grain, predominantly equiaxed and predominantly homogeneous microstructure which, when fractured, exhibits a predominantly intergranular fracture mode and a fracture toughness of at least 7 MPam$^{\frac{1}{2}}$.

38. A sintered silicon carbide ceramic body having a microstructure which exhibits predominantly clean grain boundaries between adjacent grains of silicon carbide, with the remaining grain boundaries having a discontinuous second phase located predominantly at the triple points of adjacent grains of silicon carbide, having a predominantly fine-grain, predominantly equiaxed and predominantly homogeneous microstructure and which, when fractured, exhibits a predominantly intergranular fracture mode and a fracture toughness of at least 7 MPam$^{\frac{1}{2}}$.

39. A sintered silicon carbide ceramic body made from a uniform mixture comprising from about 95.5 weight percent of silicon carbide, about 2.5 weight percent of aluminum nitride, and about 2.0 percent by weight of yttrium oxide, all percentages based upon the total mixture, wherein said sintered ceramic body has a density greater than 95 percent of theoretical, a fracture toughness, as measured by the single edge notched beam test, of at least 9 MPam$^{\frac{1}{2}}$ and a predominantly equiaxed, predominantly fine-grain and predominantly homogeneous microstructure.

40. A sintered silicon carbide ceramic body made from a uniform mixture comprising about 97.25 weight percent of silicon carbide, about 2.5 weight percent of aluminum nitride, and about 0.25 weight percent of yttrium oxide, all percentages based upon the total mixture, wherein said sintered ceramic body has a density greater that 95 percent of theoretical, a fracture toughness, as measured by the single edge notched beam test, of at least 9 MPam$^{\frac{1}{2}}$ and a predominantly equiaxed, predominantly fine-grain and predominantly homogeneous microstructure.

41. A process for producing a sintered silicon carbide ceramic body having superior fracture toughness comprising:
   a) forming a uniform mixture comprising:
      1) one or more nitrogen containing aluminum compounds in an overall amount of from 1.5 weight percent to about 10 weight percent, based upon the total weight of the mixture;
      2) one or more rare earth oxides in an overall amount of from about 0.25 weight percent and 8 weight percent, based upon the weight of the mixture;
      3) silicon carbide, in an amount of from about 82 weight percent to about 98.75 weight percent, based on the weight of the mixture, and having a specific surface area of from about 1 to about 100 square meters per gram; wherein said mixture includes a range of about more than 0.3 weight percent to about 4 weight percent, of either non-crystalline reactive oxygen from the surface of said silicon carbide or reactive oxygen in any form from said one or more nitrogen containing compound and/or from said one or more rare earth oxides, or both, said reactive oxygen being in elemental or in a compound or both;
   b) combining said mixture with a temporary binder;
   c) forming the mixture and binder in such a way as to produce a shaped object; and
   d) firing the shaped mixture under such conditions of time and temperature in an atmosphere inert to silicon carbide or in a vacuum at a temperature of between about 1775° C. and about 2200° C. until a sintered ceramic body having a predominantly homogeneous, predominantly equiaxed and predominantly fine-grain microstructure is formed having a fracture toughness, as measured by the single edge notched beam test, of at least 7 MPam$^{\frac{1}{2}}$.

42. A sintered silicon carbide ceramic body comprised of a predominately equiaxed, predominately homogeneous and predominately fine-grain microstructure comprised of silicon carbide, aluminum, nitrogen and yttria, having a density of at least 90% of theoretical and exhibiting a fracture toughness of at least 7 MPam$^{\frac{1}{2}}$.

43. The ceramic body of claim 42, having a bend strength of at least 60 ksi based on a 4-point bend test.

44. The ceramic body of claim 42, having a erosion volume loss after ten minutes of exposure of about 0.001 cm$^3$.

45. The ceramic body of claim 42, having an oxidation weight gain of about 0.1911 g/cm$^2$ at 1371° C. in 24 hours.

46. The ceramic body of claim 42, having a hardness of at least 21 GPa.

47. The ceramic body of claim 42, having an electrical resistivity of about 0.02–10,000 Ohm cm at room temperature.

48. The ceramic body of claim 42, having at least 10$^{19}$ atoms of nitrogen per cubic centimeter of silicon carbide.

49. A sintered silicon carbide ceramic body comprised of a predominately equiaxed, predominately homogenous and predominately fine-grain microstructure consisting essentially of silicon carbide, aluminum, nitrogen and yttria, having a density of at least 90% of theoretical, and exhibiting a fracture toughness of at least 7 MPam$^{\frac{1}{2}}$.

* * * * *